US009747028B1

(12) United States Patent
Allen

(10) Patent No.: US 9,747,028 B1
(45) Date of Patent: Aug. 29, 2017

(54) ARTIFICIAL MEMORY PRESSURE FOR LOW MEMORY MACHINE

(71) Applicant: Amazon Technologies, Inc., Reno, NV (US)

(72) Inventor: Nicholas Alexander Allen, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 92 days.

(21) Appl. No.: 14/106,615

(22) Filed: Dec. 13, 2013

(51) Int. Cl.
*G06F 3/06* (2006.01)

(52) U.S. Cl.
CPC .......... *G06F 3/0604* (2013.01); *G06F 3/0653* (2013.01); *G06F 3/0671* (2013.01)

(58) Field of Classification Search
CPC ..... G06F 3/0604; G06F 3/0653; G06F 3/0671
See application file for complete search history.

(56) References Cited

U.S. PATENT DOCUMENTS

| | | | | |
|---|---|---|---|---|
| 2005/0015647 A1* | 1/2005 | Okada | ................. | G06F 11/0727 714/5.1 |
| 2005/0240641 A1* | 10/2005 | Kimura | ............... | G06F 12/0253 |
| 2006/0129780 A1* | 6/2006 | Dunshea | ............. | G06F 12/1009 711/170 |
| 2008/0183424 A1* | 7/2008 | Seem | ................... | G05B 23/024 702/181 |
| 2011/0320682 A1* | 12/2011 | McDougall | ........... | G06F 12/023 711/6 |
| 2015/0026429 A1* | 1/2015 | Bobroff | ............... | G06F 12/0253 711/171 |

OTHER PUBLICATIONS

Keene, Oliver N. "The log transformation is special" in Statistics in Medicine, vol. 14, pp. 811-819 (1995). Also available at <http://rds.epi-ucsf.org/ticr/syllabus/courses/25/2009/04/21/Lecture/readings/log .pdf>.*
Gite, Vivek. "4 Linux Commands to View Page Faults Statistics" posted on Nov. 5, 2012. Also available at <http://www.cyberciti.biz/faq/linux-command-to-see-major-minor-pagefaults/>.*
Keene, Oliver N. "The log transformation is special" in Statistics in Medicine, vol. 14, pp. 811-819 (1995). Also available at <http://rds.epi-ucsf.org/ticr/syllabus/courses/25/2009/04/21/Lecture/readings/log.pdf>.*

* cited by examiner

*Primary Examiner* — Ann J Lo
*Assistant Examiner* — Jane Wei
(74) *Attorney, Agent, or Firm* — Davis Wright Tremaine LLP

(57) ABSTRACT

Techniques for addressing performance degradation when a computer system is in a memory constrained state while running one or more applications are described herein. While executing, a computer system may monitor system memory and record one or more tracked sample types and may use the collection of tracked sample types to aggregate memory size equivalents to the tracked sample types and calculate a simulated memory pressure. The simulated memory pressure may be applied to the system by allocating memory from a memory manager, thereby reducing memory pressure.

20 Claims, 10 Drawing Sheets

ARTIFICIAL MEMORY PRESSURE FOR LOW MEMORY MACHINE

BACKGROUND

Modern computer systems require robust and predictable reliability, performance, stability and availability. In many modern computer systems, particularly those running in virtualized or distributed computing environments, a plurality of applications may use shared computer resources while executing. In such computer systems, when resources such as computer memory become scarce, the applications, guest operating systems and/or other such entities may compete with one another in their demand for those resources. Such demand may cause system delays, application failures, system slowdowns and application and operating system failure. This demand may become worse in systems where a host machine supports multiple guest virtual machines, where each guest virtual machine may run a plurality of applications each with resource demands. The demand for resources is only made worse in view of the fact that while assigning resources to applications and guest operating systems is relatively straightforward, reclaiming those same resources from applications and guest operating systems is more complex. When a host is unable to reclaim scarce resources, performance of each application and guest virtual machine may suffer to the point where all applications and guest virtual machines are unable to provide even basic functionality with acceptable performance, leading to ever decreasing performance and an impaired customer experience.

BRIEF DESCRIPTION OF THE DRAWINGS

Various embodiments in accordance with the present disclosure will be described with reference to the drawings, in which.

DETAILED DESCRIPTION

Figure 1:
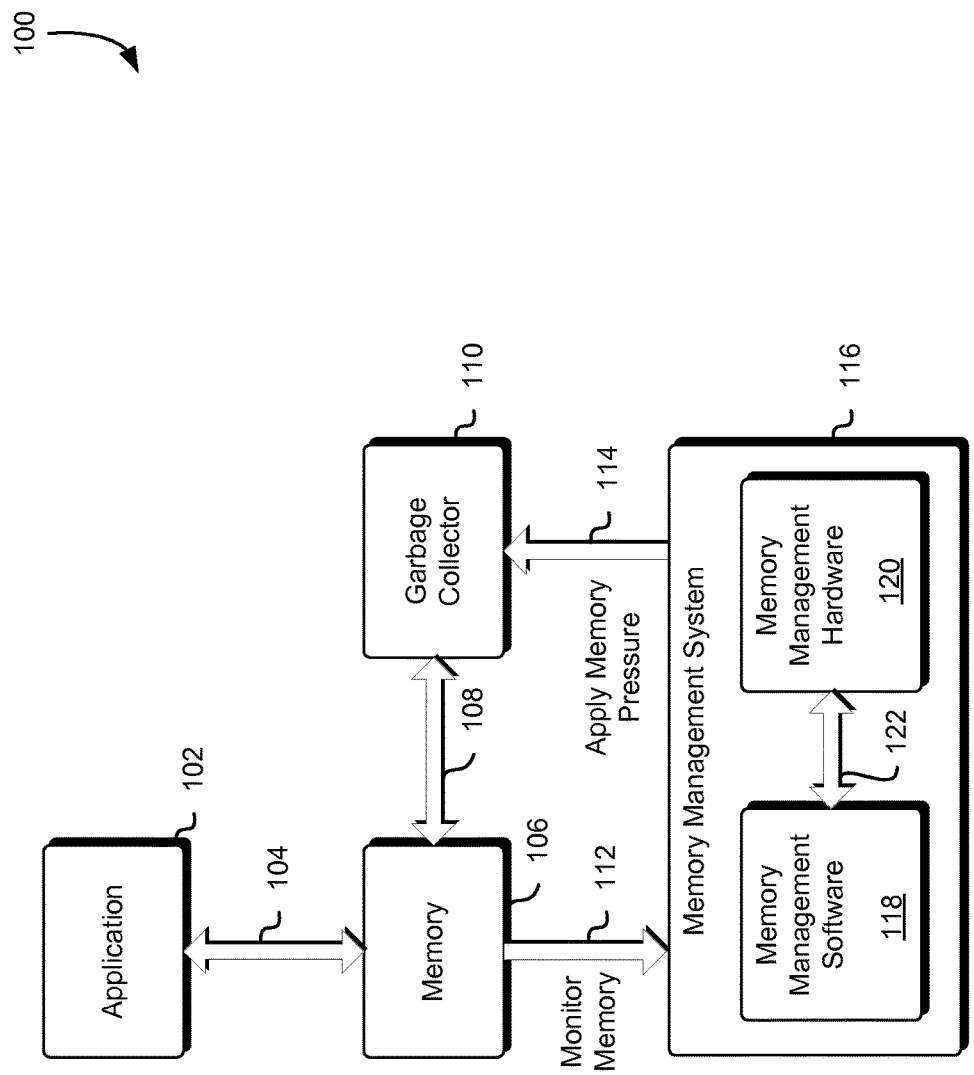
FIG. 1 illustrates an example environment in which applications running on computer systems may have memory managed using system capabilities in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for managing resources on systems and executable code operating thereon. In particular, techniques are disclosed for utilizing processor capabilities to facilitate management and distribution of system resources such as memory to and/or on behalf of operational elements of computer systems, including, but not limited to, hypervisors, operating systems, guest virtual machines, applications and processes, while a plurality of those operational elements may be operating on one or more computer systems. In some embodiments, a computer system where a distributed and/or virtualized system is operating benefits from effective management of scarce or potentially scarce system resources in order to improve operational efficiency and to provide more reliable system performance. Such distributed and/or virtualized computer systems may be effectively tuned for performance and availability based on, among other factors, the assumption that resources needed to perform a certain task will be made available when that task is performed. Without effective management of system resources, those resources may become scarce and/or unavailable which may lead to system slowdowns, reductions in system performance and/or system failure of the applications, one or more of the guest computer systems on the system and/or the entire system.

In an illustrative example, consider that a system may exhibit dramatically decreased performance when a resource, such as system memory is tightly constrained and/or overcommitted. Paging is a common memory management technique wherein memory from faster system memory is stored to and retrieved from a considerably slower secondary storage system such as swap storage, when the memory is not currently required by the system, guest virtual machine or the applications operating thereon. Paging may lead to temporary slowdowns in some applications, but may provide better overall system performance. However, when an application or system approaches a critical memory limit wherein memory is constantly or nearly constantly being paged in and out of secondary or swap storage, the application and possibly even the entire system may exhibit slowdown or even failure due to repeated and/or constant paging events. Repeated or constant paging can generally be attributed to a lack of coordination between the application and the system paging behaviors. Better coordination between applications and systems and the system paging behavior can reduce or eliminate unnecessary or repeated system paging. An application or system that exhibits pathological paging slowdown may run without any paging if a different memory management technique and/or better coordination of memory management techniques was used.

Techniques disclosed herein include employing a modified memory management strategy for a garbage-collected system running in a low memory environment. Garbage-collection is a form of memory management in which memory reclamation or deallocation may be managed and may be deferred. In some embodiments, garbage collection operations may be deferred in order to avoid adversely impacting application and/or system performance. For example, garbage collection operations may lead to momentary or sustained application latency or delay performance of finalization operations. Techniques disclosed herein include calculating and applying simulated or artificial memory pressure to the garbage collector to induce memory reclamation and to thereby reduce the probability of unnecessary paging. Techniques disclosed herein also include dynamically adjusting the simulated memory pressure based on one or more computer system measurements of the system memory. In applying simulated or artificial memory pressure to a garbage collector, a computer system and/or a memory management system may use the functionality of the garbage collector to adjust and/or optimize memory management on a system by adjusting one or more parameters of the garbage collector.

In some embodiments, an application may request computer system memory. The application may receive allocated memory from the computer system as a result of the request. In some embodiments, the computer system may allocate and assign a combination of the physical and/or logical memory. Logical memory is memory that an application may have access to, but some or all of which may not necessarily be supported by physical memory. Modern computer systems may overcommit memory and may allocate more memory than is actually available. A computer system may have, for example, eight gigabytes of physical memory available for applications but may actually allocate more than twice that much logical memory to the applications. As applications execute, the logical memory may be mapped to physical memory, thereby temporarily providing memory to the application.

Applications consume and return memory frequently and, as such, an important function of a modern computer system is managing this shared physical memory. A computer system typically has a memory management system to manage system memory. In some embodiments, applications may also have separate memory managers to help the memory management system. For example, in some embodiments, an application may create and/or otherwise obtain access to a garbage collector to manage the allocated memory. A garbage collector is a system that may be implemented as an automatic memory management process that typically operates in conjunction with one or more applications to identify and reclaim memory that the application is no longer using. For example, an application may allocate a buffer for reading data from a file. Once the file is read, the buffer may no longer be needed and may eventually be collected by the garbage collector. In some embodiments, the application may configure the garbage collector with a memory-management scheme and a collection of application-specific tuning parameters, including, but not limited to collection algorithm used, how often it runs, how aggressive the garbage collector is about marking, how to manage certain object types and a very large number of other such tuning parameters.

After the application has allocated memory and obtained access to an associated garbage collector, the application may, in some embodiments, begin executing. While the application is executing, the garbage collector may communicate with memory management software running within a computer system and executing within the environment of a computer system entity such as an operating system, a guest virtual machine, a hypervisor or some other such computer system entity to manage the memory for the application. The memory management software may manage the memory by performing memory management operations including, but not limited to, obtaining logical memory, obtaining physical memory, returning logical memory, returning physical memory, compacting memory, paging memory or a combination of these and/or other such memory management operations. In some embodiments, the memory management software may work with the garbage collector so that, based on a garbage collection heuristic, the garbage collector may attempt to compact memory, or may attempt to free memory, or may attempt to free memory pages from a list of memory pages assigned to the application so that the freed memory pages may be returned to the system and made available for use by other computer system entities.

A garbage collector may manage and/or otherwise keep track of memory for an application by allocating, de-allocating, paging and/or other memory management methods. For example, in response to the application allocating a two-hundred byte object the garbage collector may obtain sixteen four-kilobyte memory pages from the system. In subsequent allocations and deallocations the garbage collector may place additional allocated objects within, for example, the sixteen four-kilobyte memory pages. If the memory becomes scarce, either for the application or for the system, the garbage collector may, in some embodiments, attempt to compact the allocated objects so as to reduce the number of occupied memory pages. In response to a determination by the system that memory pages are in short supply or may be in short supply in the future, the garbage collector may attempt to de-allocate at least some of the memory pages and may attempt to return them to the system. A number of processes may be used by the system to determine whether memory pages may be in short supply now or in the future. For example, the system may track application memory usage and may use one or more calculations and/or heuristics to determine and/or predict that memory is, or is about to become, scarce.

In some embodiments a garbage collector may use a technique, such as a heuristic, to model memory use for an object, such as an application that allocates memory independently from the garbage collector. This modeled or simulated memory may be referred to as memory pressure. For example, if the two-hundred byte object above were to, as part of execution of the application, have a large section of memory allocated independently from the garbage collector, the application may add memory pressure causing the two-hundred byte object to appear to the garbage collector heuristic as, for example, a one-hundred-thousand byte object. In this way the garbage collector may be induced to try harder to collect the two-hundred byte object based on its true cost to the system.

In addition to using memory management software to manage memory, memory management software may use memory management hardware to manage memory. For example, in some embodiments, memory management software may use memory management hardware to maintain a mapping between allocated logical and physical memory pages. In some embodiments, the memory management hardware may also assist the memory management software to perform memory paging, such as by intercepting requests to unmapped logical pages. Memory management hardware may also assist the memory management software by providing memory to the system, tracking memory requests, controlling access to memory and/or memory paging requests and/or by providing other such functionality.

In some embodiments, the memory management system for a computer system may include software and/or hardware to monitor memory management for the system. The memory management monitor may sample the operation of the memory management software and memory management hardware. The memory management monitor may collect samples on a periodic basis, such as from performance counters, or as part of callbacks instrumenting the memory management system. The memory management monitor may monitor system memory and gather a variety of statistics about memory usage in order to facilitate making memory management systems. For example, the memory management monitor may sample page faults, or may measure instances of mapping of logical pages to physical memory, or may track and compare page faults satisfied by free memory pages as opposed to page faults that required evicting a non-free memory page from another computer system entity.

Page faults are alerts raised by computer system hardware and/or software that may occur when a program, application, process, service and/or some other such computer system entity attempts to access a logical memory page that may not be currently mapped to a physical memory page. There are a number of different types for page faults that may occur in computer systems, but the most common are major page faults and minor page faults. A major (or hard) page fault may occur when a computer system entity attempts to map a logical page of memory to a physical page of memory that may not be loaded into system memory. A hard page fault may be expensive and slow because the system or systems that manage memory for the system may need to access system hardware such as swap space, disk drives and/or other such hardware in order to load the memory page. Additionally, the system or systems that manage memory for the system may need to evict memory pages from other computer system entities when physical memory is tightly constrained in order to make space for the paged in memory. This eviction may incur additional resource and/or time costs writing the evicted memory back to the disk. A minor (or soft) page fault may occur when a physical memory page is loaded into memory but when it is not mapped to a logical memory page of the application that may be requesting access to the memory. Minor page faults may occur, for example, when physical memory is mapped to one or more logical pages of other computer system entities, but not mapped to a logical memory page of the application requesting access to the memory. Minor page faults may also occur when a page has been released from an application's memory mapping table, but not yet paged back to disk. Minor page faults are generally faster and less costly than major page faults because they do not require access to system hardware such as swap space, disk drives, and/or other such hardware and merely require updating the mapping tables.

The memory management monitor may also sample other values including, but not limited to, memory recycling velocity or median and/or average times that the system takes to remove a memory page from one mapping and then to add the page to a new mapping. The memory management may also write a freed time for a memory page and then may compute the recycling velocity based on when the memory page is next used. Alternatively, the memory management software may track a virtual queue depth for free memory pages and determine the recycling velocity based on an expected cycle time for the queue. The memory management monitor may also sample a resident set size of memory pages allocated by the application that are mapped to physical memory and may track the resident set size in terms of how the size changes over time.

In some embodiments, the memory management monitor may write the samples to a memory management history. The memory management history may, in some embodiments, provide a limited window of historical samples so as to diminish the importance of samples as the sample gets older. For example, memory management history may determine that the most recent samples are more relevant and older samples are less relevant so that older samples may be weighted as less important or even deleted entirely. In some embodiments, the memory management history may maintain samples with diminished importance of older samples by implementing as a circular or ring buffer of sample buckets. Each sample bucket may correspond to a sample window of fixed length, such as, for example, one-hundred milliseconds. In such embodiments, a particular sample bucket may be designated as a current bucket to which new samples are added and at a frequency based on the window length the ring buffer may rotate a location of the current bucket by evicting contents of an oldest bucket.

In some embodiments, the memory management history may maintain samples with diminished importance of older samples by storing one or more exponentially weighted moving averages for the tracked samples. To store an exponentially weighted moving average of a tracked sample, a computer system may multiply the previous exponentially weighted moving average of a tracked sample by a chosen constant value, and then may add the most recent tracked sample value, multiplied by one minus the constant value, to that scaled exponentially weighted moving average. The constant value determines how much weight is assigned to older sample values as compared to the weight assigned to the most recent sample values.

For example, with a constant value of one-third, at the first iteration, the exponentially decaying moving average equals the first tracked sample. At the second iteration, the weighted moving average is equal to the one-third of the first tracked sample plus two-thirds of the second tracked sample. At the third iteration, the exponentially decaying value is equal to one-ninth of the first tracked sample, plus two-ninths of the second tracked sample, plus two-thirds of the third tracked sample. In such an embodiment, the older a tracked sample is, the less it will contribute to the exponentially decaying value. At each iteration, the most recent tracked value accounts for two-thirds of the exponentially weighted moving average and all previous tracked values account for the other one-third of the exponentially weighted moving average. As may be contemplated, the example here is an illustrative example, and other constant values as well as other methods of computing an average such as a weighted moving average may be considered as within the scope of the present disclosure.

In some embodiments, in addition to storing the history of the tracked sample and/or the exponentially weighted moving average of the tracked sample, the memory management history may include one or more tally fields summarizing the values of a certain sample. In such embodiments, a running, or aggregate, total of the tracked sample may be stored along with one or more derived values such as, for example, a running average of the tracked sample. For example, when the tally field for page faults may be the sum of all tracked page faults, the memory management history may add to the page faults tally when new samples are added to the memory history. In some embodiments where the memory history maintains a ring buffer of the most recent samples, the memory management history may also subtract the oldest value from the tally field when the oldest bucket is evicted.

During execution, as the memory management system continues to sample or monitor the memory, to the memory management system may compute an artificial or simulated memory pressure based, at least in part, on the memory management history. In some embodiments, the simulated memory pressure may be calculated in response to a low memory state within the computer system or the simulated memory pressure may be calculated on a periodic basis as new memory history data is obtained. An artificial memory pressure may be calculated based on the memory management history by, for example, for each of a plurality of tracked sample types, constructing a memory size equivalent for the tally of samples of the type and calculating a total artificial memory pressure based on the sum of the memory size equivalents. After having calculated the simulated memory pressure, the memory management history may apply the simulated memory pressure to the garbage collector by constructing memory objects, constructing memory requests, adjusting parameters associated with memory objects, adjusting parameters associated with the garbage collector, altering memory requirements for system objects and/or other such techniques. In this way the garbage collector may be induced to adjust its work effort in coordination with a system memory management strategy without altering the functionality of the garbage collector.

In some embodiments, the computer system may include a plurality of applications with associated memory and a plurality of garbage collectors associated with the associated memory. In such embodiments, the memory management system may apply the simulated memory pressure to each of the garbage collectors equally, or memory management system may select a subset of the garbage collectors to apply the memory pressure to those garbage collectors unequally, thereby favoring and/or disfavoring one or more of the applications running on the system. For example, the memory management system may determine that reclaiming the memory associated with a certain class of applications is more valuable to the system and may, as a consequence, apply the simulated memory pressure to the one or more garbage collectors associated with that memory. The memory management system may determine that reclaiming the memory associated with an application is more valuable to the system based on a variety of factors including, but not limited to, the type of the application, the owner of the application, the business value of the application, the business value of other applications on the system, the amount of resources claimed by the application, the amount of resources needed by other applications on the system and/or other such factors.

FIG. 1 illustrates an environment 100 where applications running in computer systems may have memory requests satisfied, memory monitored and memory pressure applied, as well as the associated code running thereon, in accordance with at least one embodiment. An application 102, which may be one of a plurality of applications running on a host machine, guest virtual machine, computing device or some other computer system may 104 request allocation of memory 106 from that computer system. The memory allocation may be as a result of changes to the resource requirements for the application, or may be as a result of the beginning of execution of the application, or may be as a result of changes to the resource requirements for the computer system, or as a result of changes to the resource requirements for one or more of the other applications running on the computer system or as a result of changes to a combination of these and/or other resource requirements. The memory allocation may be a request for physical memory, or may be a request for logical memory that may be mapped to physical memory, or may be a request for a combination of physical and logical memory or may be a request for some other such memory allocation. In some embodiments, the memory may be provided to the application by a memory management system or subsystem running on the computer system including, but not limited to, an operating system, a hypervisor, a memory manager such as a garbage collector, a process running under the control of an operating system, a process running under the control of a hypervisor, a process running under the control of a garbage collector, system hardware such as a memory management unit configured to monitor and/or manage memory state or a combination of these and/or some other such memory management systems or subsystems.

A garbage collector 110 may be associated with the application 102 and/or with the memory 106. In some embodiments, the garbage collector may be instantiated and associated with the application and/or with the memory. In some embodiments, the garbage collector may have been previously created by, for example, a memory management system, operating system, hypervisor or some other such entity and may be associated with the application and/or with the memory. The garbage collector may be associated with the application and/or with the memory when the memory is requested, or when the memory is allocated, or when the application is created, or when the computer system is started and/or at some other time according to system policy. As mentioned above, the garbage collector may be configured with one or more memory managed schemes and/or policies and may also be configured with one or more application-specific tuning parameters. Once configured, the garbage collector may begin 108 managing the memory 106 by, for example, responding to requests by the application to allocate and/or release memory, responding to changes in memory demands for the entire system, responding to the application processing state and potential lulls in processing to perform garbage collection functions, mapping logical memory to physical memory, reclaiming mapped memory, compacting memory pages and/or other such memory and/or application management functions. As part of performing garbage collection functionality, the garbage collector may, in some embodiments, interact with the application 102, the memory 106, memory management software, memory management hardware, operating systems, hypervisors, other applications, other systems, other garbage collectors and/or other such computer system entities.

Periodically, in the course of the execution of the application 102, a memory management system 116 may 112 monitor the memory 106. As mentioned herein, the memory management system may be, or may be a part of, an operating system, or a hypervisor, or some other such resource management entity. For example, on a host computer system with an operating system and a plurality of applications, the memory management system may be a process running under control of the host operating system. In another example, on a host computer system with an operating system, one or more hypervisors, a plurality of guest virtual machines with guest virtual machine operating systems and with each guest running a plurality of applications, the memory management system may be a cooperative effort between the host operating systems, the one or more hypervisors and the guest operating systems. In some embodiments, the memory management system 116 may include memory management software 118 which may be configured to at least 112 monitor the memory and respond to resource demands for memory from one or more applications, garbage collectors, guest virtual machines and/or other such entities. In some embodiments, the memory management system 116 may also include memory management hardware 120 such as a hardware memory management unit that may be configured to 122 connect with the memory management software 118 and aid the memory management software in monitoring the memory and responding to system resource demands for memory. For example, in some embodiments, memory management hardware may be configured to respond to hardware page faults and to alert memory management software that an application, process, service, system, device, operating system or other such computer system entity is requesting memory resources. In such embodiments, the memory management hardware may be configured to assist the memory management software in mapping physical memory pages to logical memory pages for computer system entities.

As a result of 112 monitoring memory, the memory management system 116 may determine, as a result of one or more system configuration parameters, to 114 apply memory pressure to the garbage collector. For example, the memory management hardware 120 may track page faults that occur as a result of the application 102 requesting memory allocations and the memory management software 118 may track how those page faults are processed such as, for instance, by providing memory pages from free pages versus providing memory pages by evicting memory pages from other computer system entities. As a result of these values, the memory management system may determine an actual and/or pending low memory state exists in the system and may, in some embodiments, 114 apply memory pressure to one or more garbage collectors in order to free up additional memory. As may be contemplated, the memory management system, the memory management software and the memory management hardware may use a variety of other methods to 112 monitor memory and determine whether to 114 apply memory pressure. The examples mentioned herein are illustrative examples and other methods for monitoring memory and determining whether to apply memory pressure may be considered within the scope of the present disclosure.

Figure 2:
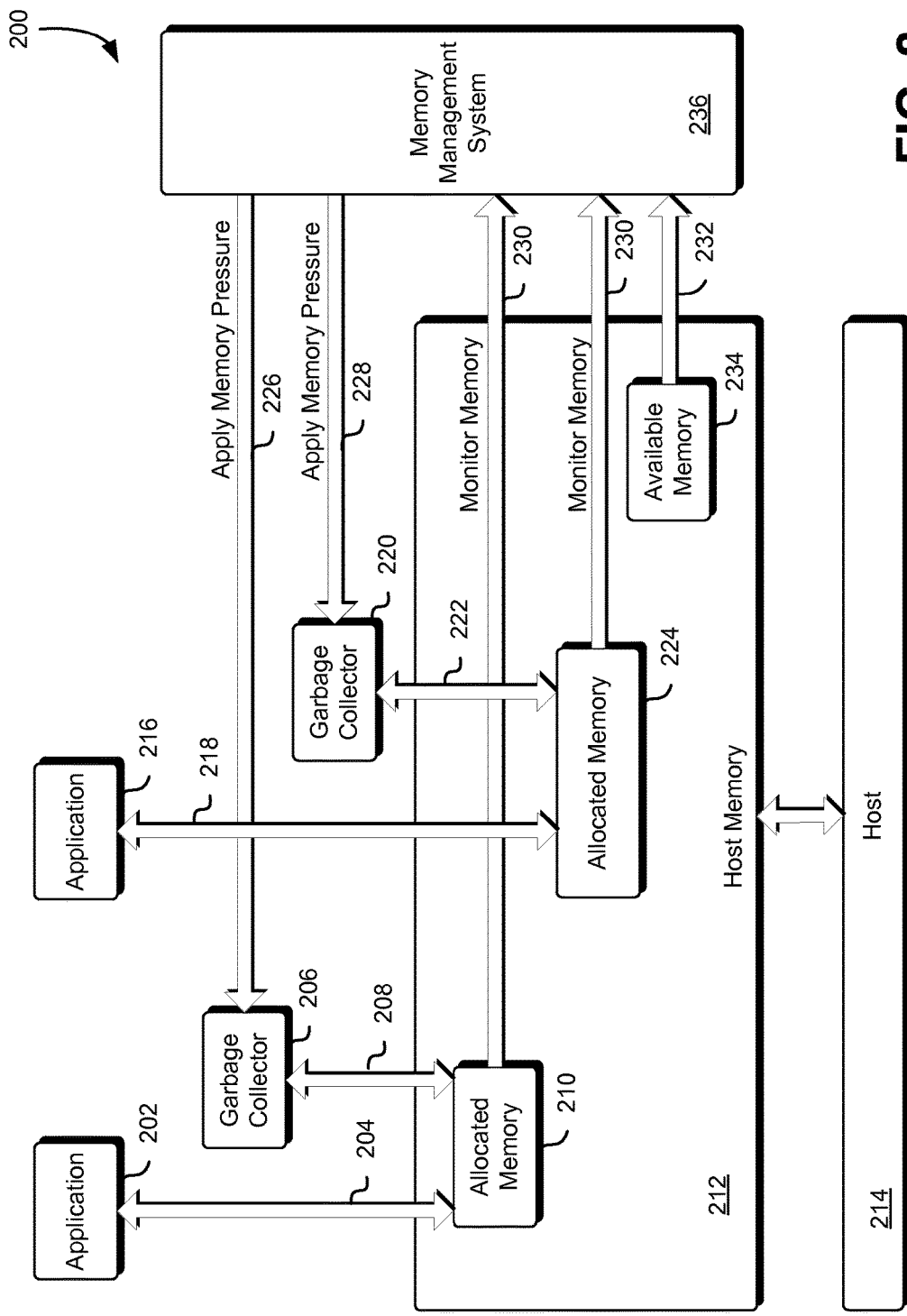
FIG. 2 illustrates an example environment in which a plurality of applications on a computer system may have memory managed in accordance with at least one embodiment.

A computer system, such as the computer system described at least in connection with FIG. 1, may provide memory management and apply memory pressure to a plurality of applications and their associated memory. FIG. 2 illustrates an example environment 200 where a plurality of applications on a computer system may have memory managed as described herein at least in connection with FIG. 1 and in accordance with at least one embodiment. An application 202 may 204 request an allocation of memory from host memory 212 on host machine 214. Additionally, an application 216 may 218 request an allocation of memory from host memory 212 on host machine 214. The requests for memory allocation by application 202 and by application 216 may be for a variety of reasons as described herein at least in connection with FIG. 1 such as, for example, changes in the resource needs of the applications. In some embodiments, the memory 210 that the system allocates to application 202 may include memory that corresponds exactly to the needs of the application. For example, the application may request sixty-four kilobytes of memory and the system may provide sixteen pages of memory each of four kilobytes. The system may also provide excess memory to the application, in anticipation of future resource needs. The system may be more likely to provide excess memory to the application when the system is not in a low memory state and might respond to a request for, for example, sixty-four kilobytes of memory with a block of, for example, two-hundred and fifty-six kilobytes of memory.

The memory 210 allocated to application 202 and the memory 224 allocated to application 216 may include physical memory, logical memory or a combination of physical and logical memory. For example, the two-hundred and fifty-six kilobytes of memory provided to an application as a result of a request for sixty-four kilobytes may include sixty-four kilobytes of physical memory pages mapped to logical memory pages with the remaining logical memory pages not mapped to physical memory until needed by the application. If, for example, allocated memory 210 included such a mixture of mapped and unmapped logical memory, the garbage collector 206 associated with 208 allocated memory 210 allocated to application 202 may be configured to manage mapping and/or unmapping physical memory to the logical memory in the allocated memory 210 as the resource needs of the application 202 may change. Similarly, garbage collector 220 may 222 manage allocated memory 224 for application 216, responding to changing memory needs such as requests for more memory, releasing of memory pages, allocations of independent memory buffers and/or other such changing memory needs.

As mentioned herein, at least in connection with FIG. 1 and in accordance with at least one embodiment, the allocated memory 210 and the allocated memory 224 may have an associated memory management system 236 which may be configured to at least monitor 230 and/or otherwise manage the allocated memory. In some embodiments, the memory management system 236 may also be configured to monitor and/or otherwise manage unallocated or available memory 234. For example, in a system with a surplus of available memory 234, it may not be necessary for the memory management system 236 to 226 apply memory pressure to garbage collector 206 or 228 apply memory pressure to garbage collector 220 in order to free up memory. However, in a system with a comparatively small amount of available memory 234, the memory management system may determine that it may be necessary to apply memory pressure to one or more of the garbage collectors in the system. In such a system, the memory management system may determine that a particular garbage collector may be a better candidate for applying memory pressure by, for example, examining the resources currently held by the garbage collector, or by examining the past, current and/or predicted resource needs of the application, or by examining the past, current and/or predicted resource needs of other applications or by combination of these and/or other such determining factors.

Figure 3:
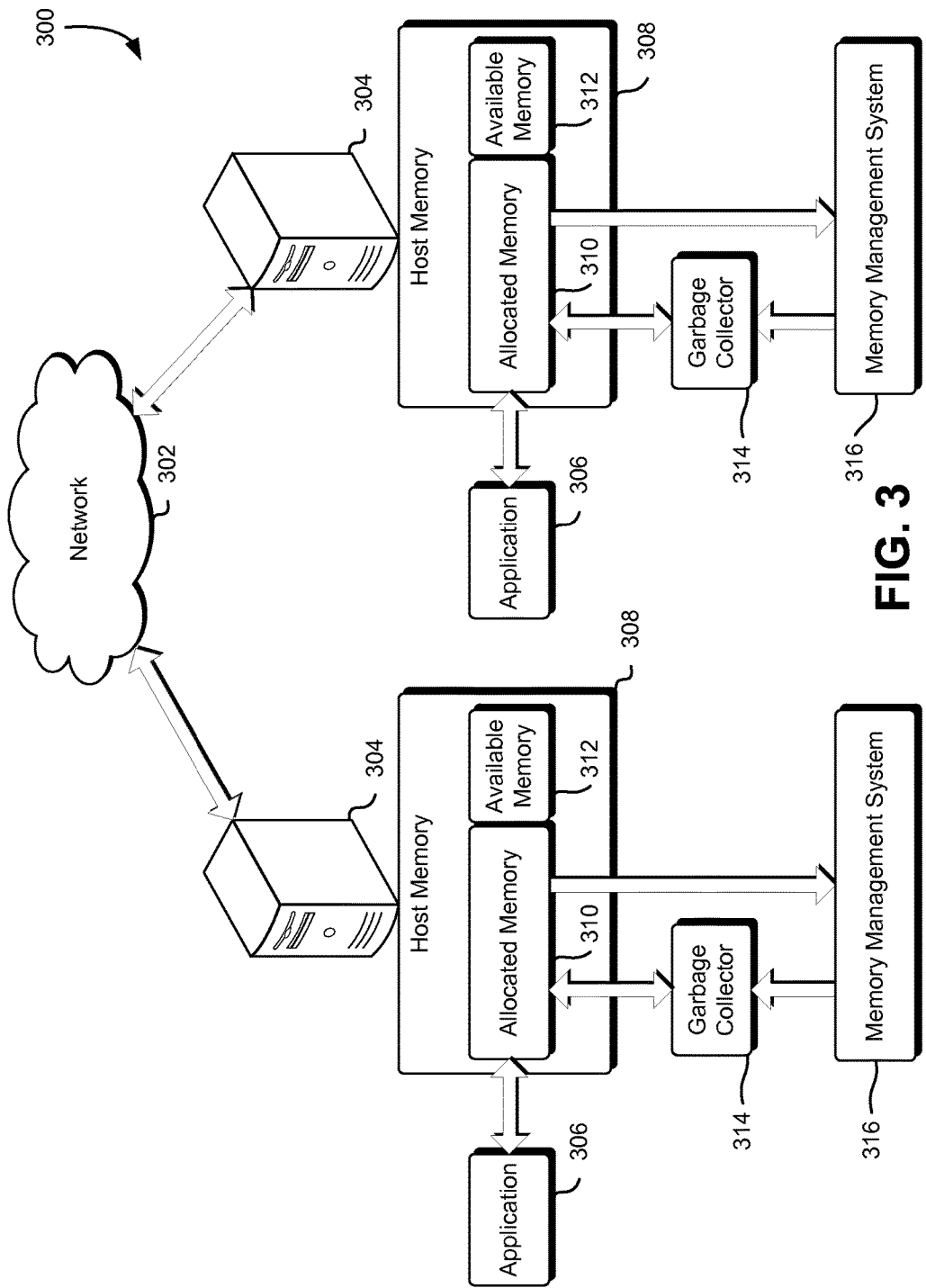
FIG. 3 illustrates an example environment in which distributed computing environment in which various embodiments may be exercised in accordance with at least one embodiment.

As previously mentioned, host machine 214 from FIG. 2 may be among a plurality of hosts interconnected in a distributed computing system and/or datacenter. FIG. 3 illustrates a distributed computing environment and/or datacenter environment 300 in which various embodiments may be exercised. One or more hosts 304 may be running in a distributed computing system and/or datacenter connected by one or more networks 302 and/or entities associated therewith, such as other servers connected to the network, either directly or indirectly. The network may, for example, be a local network, an internal network, a public network such as the Internet, a wide-area network, a wireless network, a mobile network, a satellite network, a cellular network, a distributed computing system with a plurality of network nodes and/or other such networks. Each host 304 may have one or more applications 306 which may have one or more pages of allocated memory 310 provided from host memory 308 and/or one or more pages of unallocated or available memory 312 that may be made available to applications running on the host. In some embodiments, the allocated memory may be shared between one or more applications. In some embodiments, the allocated memory may be dedicated to one or more of the one or more applications.

Each set of pages of allocated memory may have a garbage collector 314 associated with the allocated memory 310 configured to at least allocate memory to an application. In some embodiments, the garbage collector may also be configured to reclaim memory from the application, compact memory pages, map logical memory to physical memory and/or other such memory management operations. In some embodiments, each application 306 may have a dedicated garbage collector 314 configured to respond to the resource needs of that application. In some embodiments, one or more applications may share the resource of a single garbage collector or of a single garbage collector system. In some embodiments, the garbage collector 314 may work in concert with a memory management system 316 to, for example, monitor memory usage, provide physical and/or logical memory, respond to page faults and/or other such memory events. As described herein, at least in connection with FIG. 2 and in accordance with at least one embodiment, the memory management system may also provide additional memory management functions such as, for example, monitoring memory, determining the existence of, responding to and/or predicting low memory conditions and mitigating actual and/or potential low memory conditions by, for example, applying memory pressure to the garbage collectors.

Figure 4:
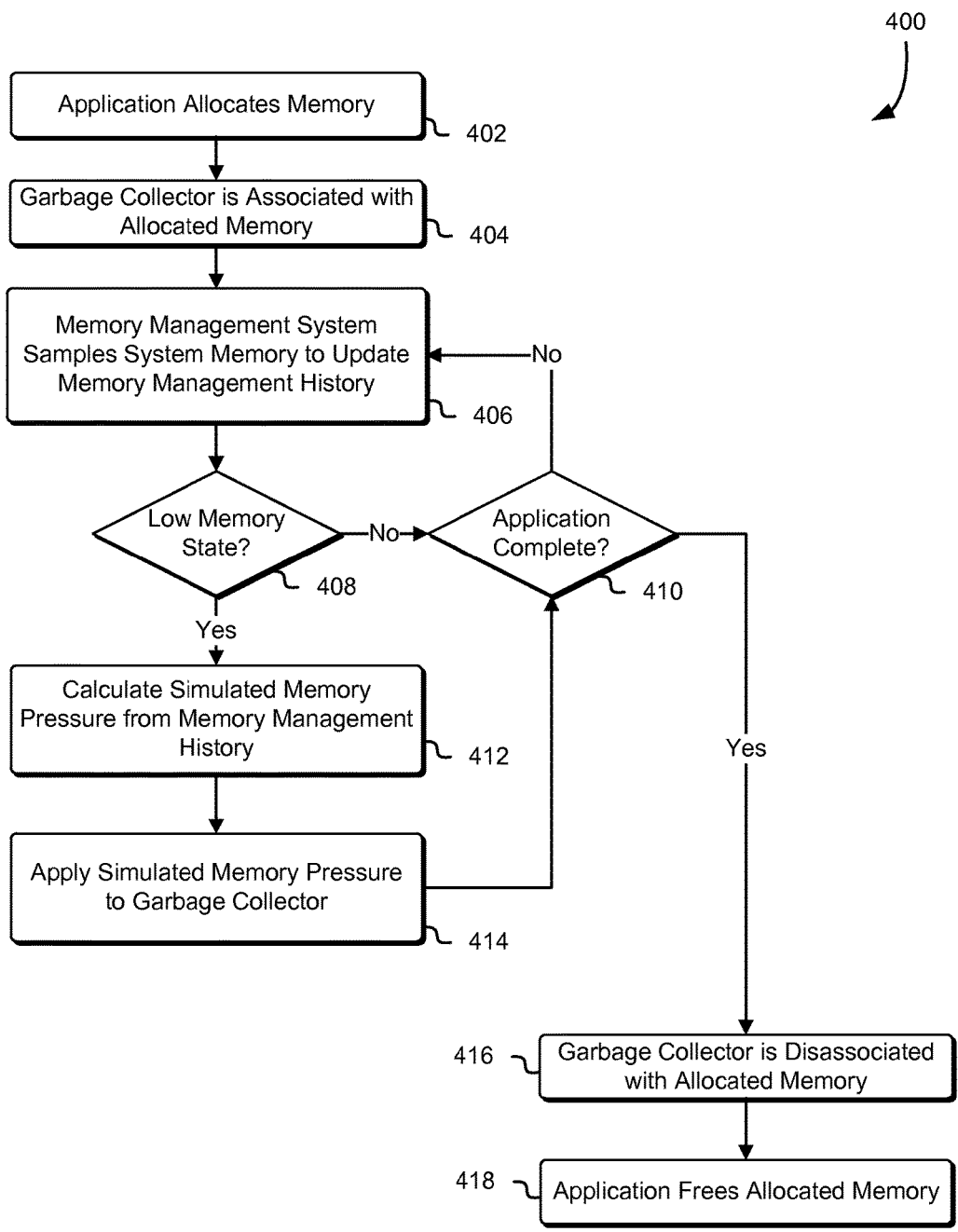
FIG. 4 illustrates an example process for responding to memory allocation requests from an application and for responding to a low memory state in a computer system in accordance with at least one embodiment.

FIG. 4 illustrates an example process 400 for responding to memory allocation requests from an application and for responding to a low memory state in a computer system as illustrated at least in connection with FIG. 1 and in accordance with at least one embodiment. The steps in the process illustrated in FIG. 4 may be performed by a variety of computer system entities including, but not limited to, an application such as application 102 in FIG. 1, a garbage collector such as garbage collector 110 in FIG. 1 or a memory management system such as memory management system 116 in FIG. 1.

An application 402 may allocate memory and 404 may associate a garbage collector with the allocated memory. The garbage collector may be configured with a variety of configuration parameters according to system needs, policies and/or requirements as described herein at least in connection with FIG. 1 and in accordance with at least one embodiment. For example, the garbage collector may be configured to perform various memory management functions associated with reclaiming memory at a certain interval, or when the application is idle or for a combination of these and/or other reasons.

While the application is running, and while the garbage collector is managing the memory allocated by the application, a memory management system associated with the computer system may begin 406 sampling the memory of the system in order to create and/or update a memory management history. In some embodiments, the memory may be sampled by a memory management monitor which may be configured to at least monitor computer system memory. In some embodiments, the memory management monitor may sample the operation of memory management software running within the memory management system as described herein at least in connection with FIG. 1 and in accordance with at least one embodiment. In some embodiments, the memory management monitor may sample the operation of memory management hardware running within the memory management system as described herein at least in connection with FIG. 1 and in accordance with at least one embodiment.

The memory management monitor may monitor the computer system memory using a variety of techniques and may track a number of different corresponding sample types. In some embodiments, the memory management monitor may monitor the computer system memory to track samples of the number of major page faults taken by the system to map logical pages to physical memory. In such embodiments, the memory management monitor may separately track samples of page faults satisfied by free memory pages and may also track samples of page faults that required evicting a non-free memory page from another computer system entity. In some embodiments, the memory management monitor may sample and record a memory recycling velocity by, for example, tracking samples of a median or average time from when a memory page is removed from a mapping to when the memory page is added to a new mapping. The memory management monitor may also compute a recycling velocity by tracking samples of a freed time for a memory page and then comparing that freed time to a time when the memory page is next used. The memory management software may also, in some embodiments, track a virtual queue depth for free memory pages and determine the recycling velocity based on an expected cycle time for the queue. In some embodiments, the memory management monitor may track samples of a resident set size of memory pages allocated by the application that are mapped to physical memory. The memory management monitor may track samples of the resident set size in terms of how the size changes over time. As may be contemplated, these methods and/or techniques for the memory management monitor to track samples the computer system memory are merely illustrative examples, and other methods of sampling and/or recording computer system memory statistics may be considered within the scope of the present disclosure.

If the computer system enters 408 a low memory state, the computer may then take steps to mitigate that low memory state. A low memory state may occur as a result of the computer system overcommitting memory resources to the point where memory resources may become scarce and/or unavailable. For example, a computer system may have a certain amount of physical memory and may commit up to several times that amount of physical memory to the logical memory of plurality of applications running on the computer system. Provided that the memory needs of each of the applications can be met by mapping physical memory to logical memory, when the application needs the memory, the system may have overcommitted memory, but still may not be in a low memory state. When the computer system begins spending time and/or resources providing that memory to the applications point that performance may begin to degrade, the computer system may enter a low memory state.

A computer system may enter a low memory state as a result of the application in question requesting more memory, but may also enter a low memory state as a result of some other computer system entity requesting more memory. In some embodiments, a computer system may also enter a future low memory state wherein the computer system, using a variety of predictive techniques, determines that the computer system may soon enter a low memory state and takes actions to mitigate the low memory state before such a state actually occurs. The computer system may determine that a low memory state has occurred, or is about to occur, based on a variety of techniques including, but not limited to, sampling, response to system events such as page faults, heuristics and/or other such techniques.

In some embodiments, if the computer system is 408 not in a low memory state and if the 410 application is not complete, the application may continue executing and 406 the memory management system may continue to monitor the memory and update the memory management history. If the computer system is 408 in a low memory state, the memory management system may begin techniques to mitigate the low memory state. In some embodiments, the memory management system may attempt low memory state mitigation by 412 calculating simulated memory pressure based at least in part on the memory management history. The memory management system may, for example, construct a memory size equivalent for each of a plurality of tracked sample types based at least in part on the tally of samples of the type from the memory management history. The memory management system may also, for example, calculate a total artificial memory pressure based on the sum of the memory size equivalents. In some embodiments the memory management system may transform the memory size equivalents derived from and/or determined by the memory management history according to an equivalence curve. It may be desirable in some embodiments to apply an equivalence curve because it may be undesirable to apply a memory pressure greater than the total machine memory. In such embodiments, the memory management system may transform the memory size equivalents or their sum using, for example, a logarithmic or an approximately-logarithmic curve converging to an appropriate upper limit as determined by the computer system.

Once the simulated memory pressure is calculated, the memory management system may 414 apply the simulated memory pressure to one or more of the garbage collectors as described herein at least in connection with FIG. 1 and in accordance with at least one embodiment. In some embodiments, the memory management history may construct an object of small size and use the memory pressure facility of the garbage collector to apply the artificial memory pressure to the object. In some embodiments, the memory management history may direct a garbage collector heuristic to behave in response to the simulated memory pressure. In some embodiments, the memory management history may adjust one or more parameters of the garbage collector. In some embodiments, the memory management history may adjust one or more parameters of one or more allocated memory objects associated with the garbage collector. For example, the memory management history may adjust an apparent free space size of memory available to the garbage collector based on the artificial memory pressure or may adjust the allocated memory of an object associated with the garbage collector.

In some embodiments, after 410 the application is complete, a number of actions may be taken to clean up and/or finalize the application. For example, the garbage collector may clean up all remaining objects before 416 disassociating itself from the memory and/or the application. The system may 418 free any allocated memory associated with the application, thereby returning it to the available system memory heap.

Figure 5:
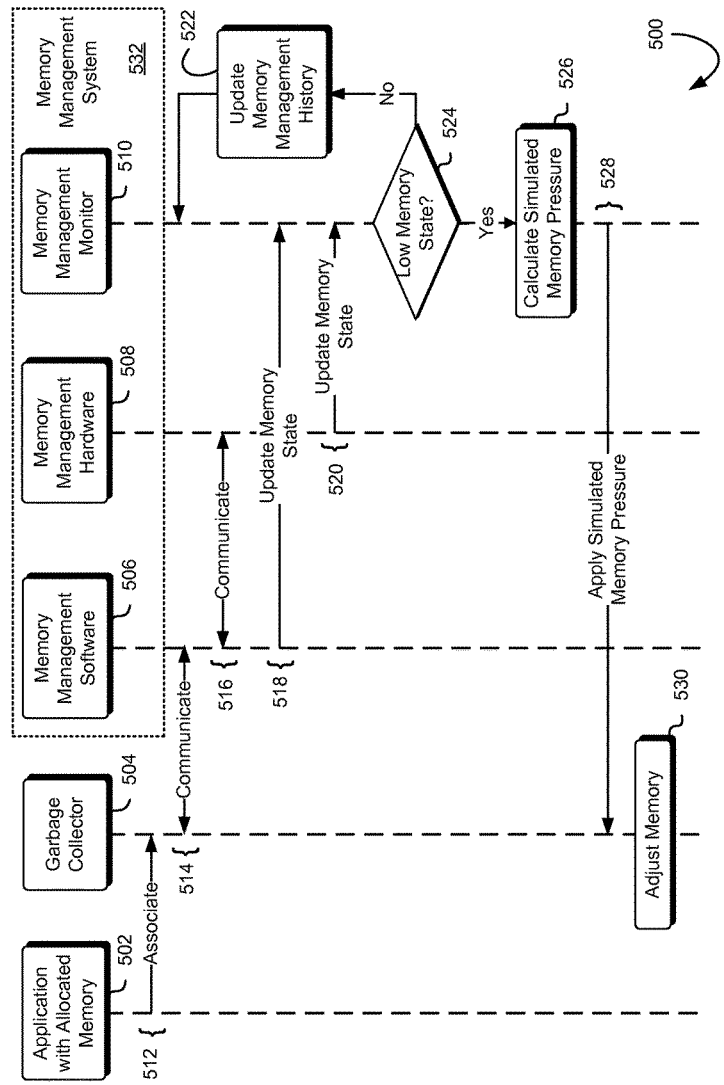
FIG. 5 illustrates an example process and timeline for monitoring memory, updating a memory management history and applying an artificial or simulated memory pressure to a garbage collector in accordance with at least one embodiment.

FIG. 5 illustrates an example process and timeline 500 for monitoring memory, updating a memory management history and applying an artificial or simulated memory pressure to a garbage collector as described herein at least in connection with FIG. 1 and in accordance with at least one embodiment. An application with allocated memory 502 may first associate 512 with a garbage collector 504 so that the garbage collector may manage the allocated memory on behalf of the application. The garbage collector may begin 514 communications with the memory management software 506 in the memory management system 532 to, for example, request further memory allocations, return freed memory or map physical memory to allocated memory pages. The garbage collector may also receive and/or respond to requests, commands and/or information from the memory management software such as, for example, alerts about low memory states and/or other such information.

The memory management software 506 may, in some embodiments, 516 begin communications with memory management hardware 508 running with the memory management system 532 to, for example, process and/or respond to page faults, track memory usage, assist with paging memory or other such operations as described herein at least in connection with FIG. 1 and in accordance with at least embodiment. In some embodiments, the memory management software 506 may update 518 the memory state to a memory management monitor 510 running within the memory management system 532. In some embodiments, the memory management hardware 508 may 520 update the memory state to a memory management monitor 510 running within the memory management system 532. In such embodiments where the memory management software and/or the memory management hardware may update the memory state to the memory management monitor, the updates may begin before the process and timeline illustrated in FIG. 5 begins and may, in some embodiments, continue for the entire execution time of the system, beginning when the system starts up and continuing until the system shuts down. In such embodiments, the memory management system, which may be part of the operating system of the host or controlled by the operating system of the host and which may operate independently of any running applications, may receive updates from application dependent objects such as garbage collectors 504 as those application dependent objects are instantiated.

The memory management monitor 510 may receive the memory state information from the memory management software 506 and/or the memory management hardware 508 and may, in some embodiments, first determine whether a low memory state 524 has occurred or is about to occur in the computer system. If the memory management monitor does not detect a low memory state, the memory management monitor may 522 update the memory management history and may then wait for the next updates from the memory management software and/or from the memory management hardware. If the memory management monitor determines that a low memory state 524 has occurred or is about to occur, the memory management monitor may 526 calculate a simulated or artificial memory pressure and may then 528 apply that simulated memory pressure to the garbage collector 504 so that 530 memory may be adjusted. In some embodiments, the memory management monitor may 526 calculate the simulated memory pressure as a result of the low memory state 524. In some embodiments, the memory management monitor may continually calculate the simulated memory pressure for the system and may thus have it available to apply to one or more garbage collectors as needed.

Figure 6:
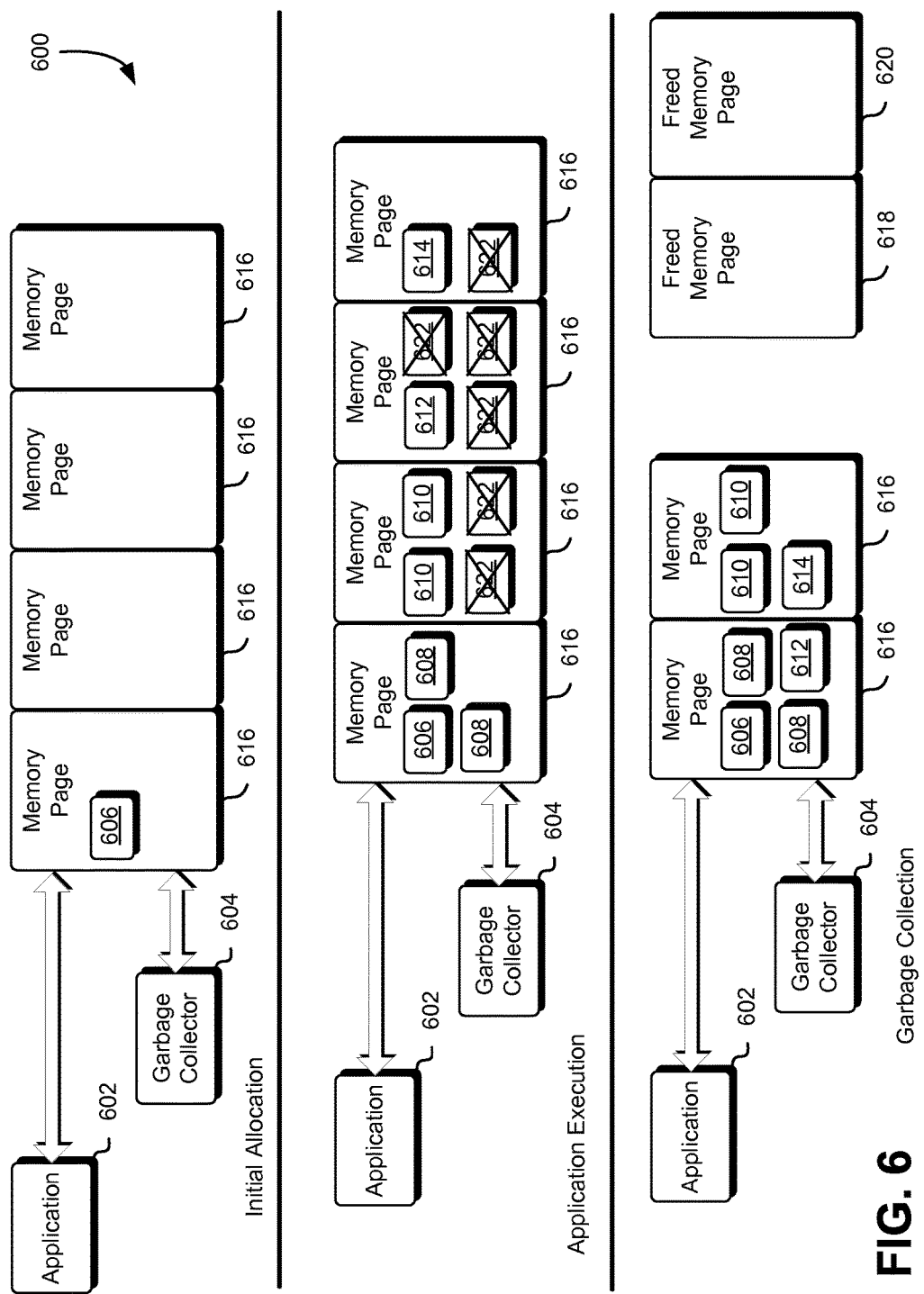
FIG. 6 illustrates an example environment in which memory may be allocated to an application, may be further allocated to an application during application execution and may be garbage collected and/or compacted in accordance with at least one embodiment.

FIG. 6 illustrates an example environment 600 where memory may be allocated to an application, may be further allocated to an application during application execution and may be garbage collected and/or compacted as described herein at least in connection with FIG. 1 and in accordance with at least one embodiment. FIG. 6 illustrates the operation of a garbage collector associated with memory allocated by an application. An application 602 may request an initial allocation of memory 606 from a memory management system. The memory management system may allocate one or more memory pages 616 in response to the request for memory and may also instantiate and/or otherwise a garbage collector 604 with the allocated memory. During application execution, the application may request further memory allocations such as allocations 608, 610, 612 and 614. The garbage collector 604 may work with the memory management system to provide the memory from the previously allocated memory. During execution, the application may also release memory allocations 622 that it no longer needs. During garbage collection, the garbage collector may free up all released memory allocations 622 and may also compact memory allocations, moving memory allocations 612 and 614 to other memory pages, thereby freeing two memory pages. In some embodiments, the freed memory pages 618 and 620 may be released back to the computer system, particularly in cases where the computer system is in a low memory state.

Figure 7:
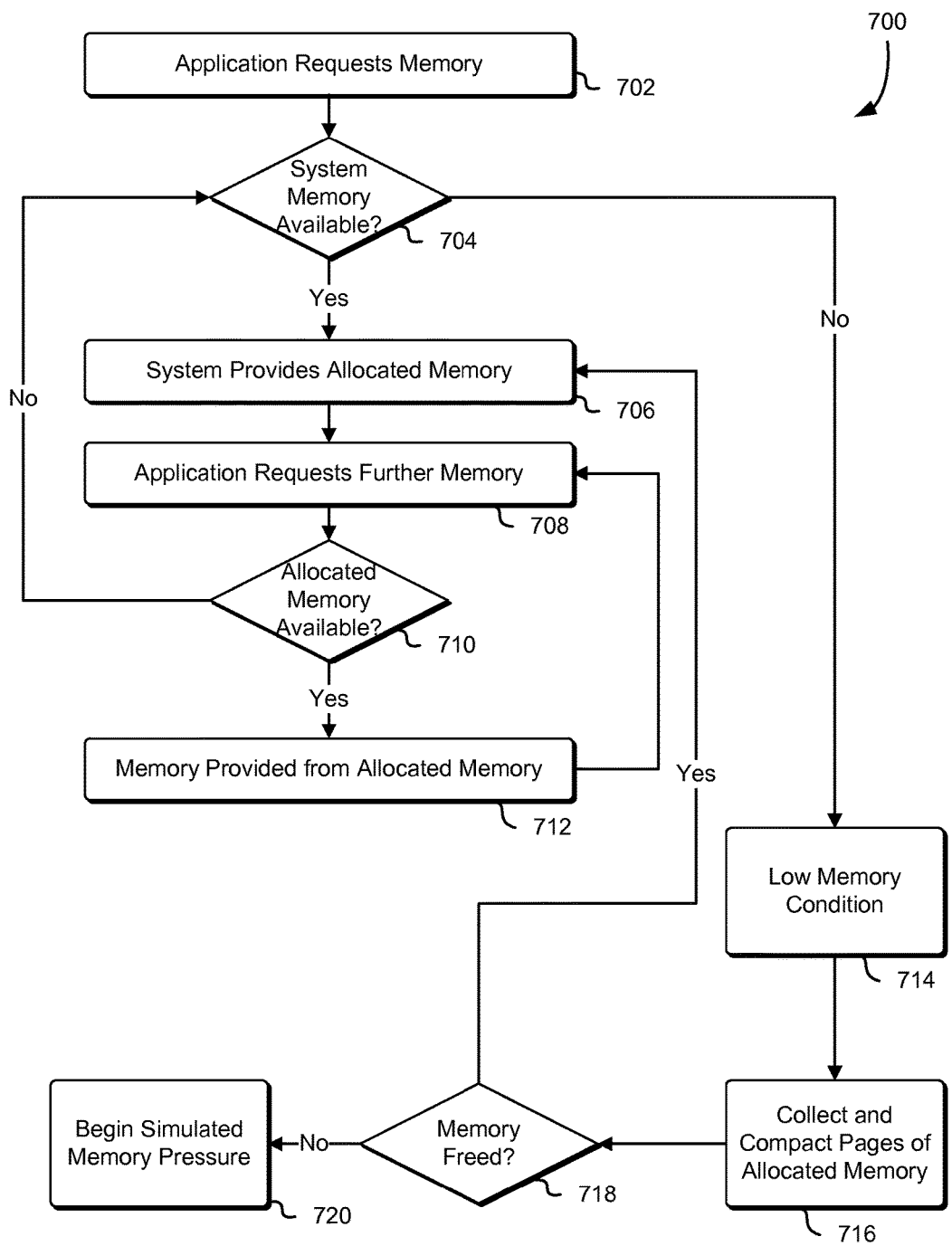
FIG. 7 illustrates an example process for responding to memory request from an application and for responding to a low memory state or a potentially low memory state on a computer system in accordance with at least one embodiment.

FIG. 7 illustrates an example process 700 for responding to memory request from an application and for responding to a low memory state or a potentially low memory state on a computer system, as described herein at least in connection with FIGS. 1 and 6 and in accordance with at least one embodiment. The steps in the process illustrated in FIG. 7 may be performed by a variety of computer system entities including, but not limited to, an application such as application 102 in FIG. 1, a garbage collector such as garbage collector 110 in FIG. 1 or a memory management system such as memory management system 116 in FIG. 1.

An application requests memory 702 and if memory is available 704, system memory may be 706 allocated and provided to the application. During execution, the application may request 708 further memory from the allocated memory which may be provided by the garbage collection system or by the memory management system. In some embodiments, if 710 further allocated memory is available then the memory may be provided 712 from allocated memory and the application and/or the garbage collection will wait until the next memory request 708. In some embodiments, if no allocated memory is available, the application and/or the garbage collector may then 704 request additional system memory.

In some embodiments, when 704 there is no system memory available, the system may enter 714 a low memory state or condition. In some embodiments, the low memory state may be entered as a result of a memory request from the application or as a result of a memory request from some other application, process, service, system or some other such other computer system entity. In some embodiments, the low memory state may be predicted by the computer system according to one or more predictive systems associated with the computer system memory management system. The computer system may first rely on the garbage collector of this and/or other applications to collect freed memory objects and/or compact memory pages 716 as described herein at least in connection with FIG. 6 and in accordance with at least one embodiment. If sufficient memory is freed 718 by these garbage collection actions, then the system may provide 706 the allocated memory. If sufficient memory is not freed 718 by these garbage collection actions then the system may begin 720 simulated memory pressure actions as described herein at least in connection with FIG. 5 and in accordance with at least one embodiment.

Figure 8:
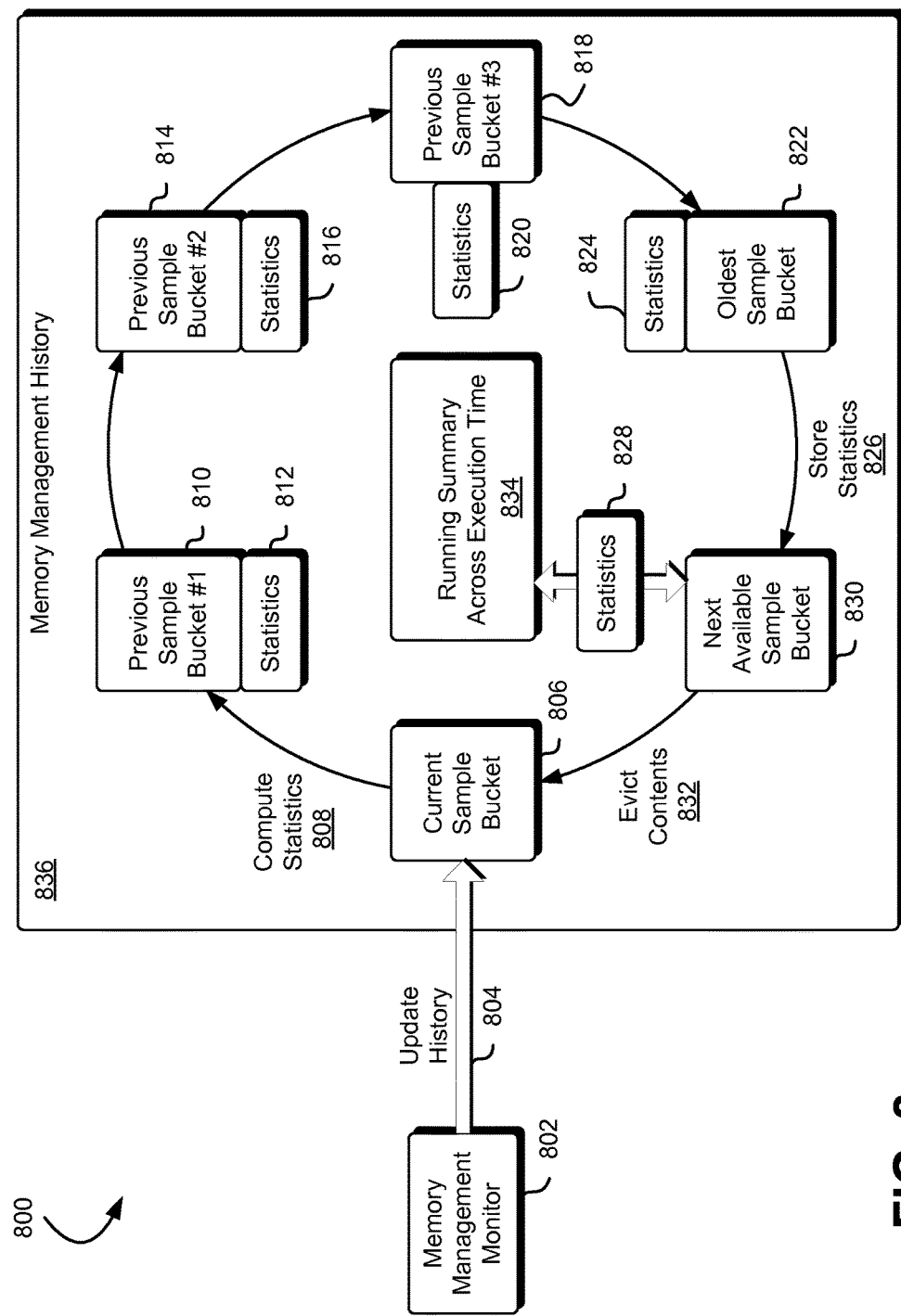
FIG. 8 illustrates an example environment in which memory management history provided by the memory management monitor is recorded in accordance with at least one embodiment.

FIG. 8 illustrates an environment 800 for recording the memory management history provided by the memory management monitor as described herein at least in connection with FIG. 4 and in accordance with at least one embodiment. A memory management monitor 802 may 804 update memory history to a memory management history 836. In some embodiments, the memory management history may be recorded in a circular or ring buffer of a plurality of sample buckets. In some embodiments, each sample bucket may contain samples of memory measurements from, for example a determined time period such as one-hundred milliseconds. The memory management monitor 802 may update the history in the current sample bucket 806. After the determined time period for a particular bucket is past, the memory management history may rotate the ring and perform a number of actions including, but not limited to, computing statistics 808 for the current sample bucket, evicting 832 the contents of the next available sample bucket 830 and promoting the next available sample bucket 830 to the current sample bucket.

After the statistics are computing for the most recent sample bucket and the ring is rotated, the current sample bucket 806 may become the first previous sample bucket 810 with associated statistics 812 for the most recent sample period. Because it may take longer than a single sample period to compute the statistics for a sample bucket, the ring may rotate more than once while the statistics are computed. As the ring rotates, the first previous sample bucket 810 may become the second previous sample bucket 814 with statistics 816 and the second previous sample bucket 814 may become the third previous sample bucket 818 with associated statistics 820. As the rotation of the ring continues, eventually a sample bucket may become the oldest sample bucket 822 with associated statistics 824. At this point, or at any point after the statistics are computed, the statistics 828 may be stored 826 into a running summary of the statistics across the execution time 834 and the sample bucket may become the next available sample bucket 830, ready for eviction 832 of the contents of the bucket and promotion to the current sample bucket 806.

Figure 9:
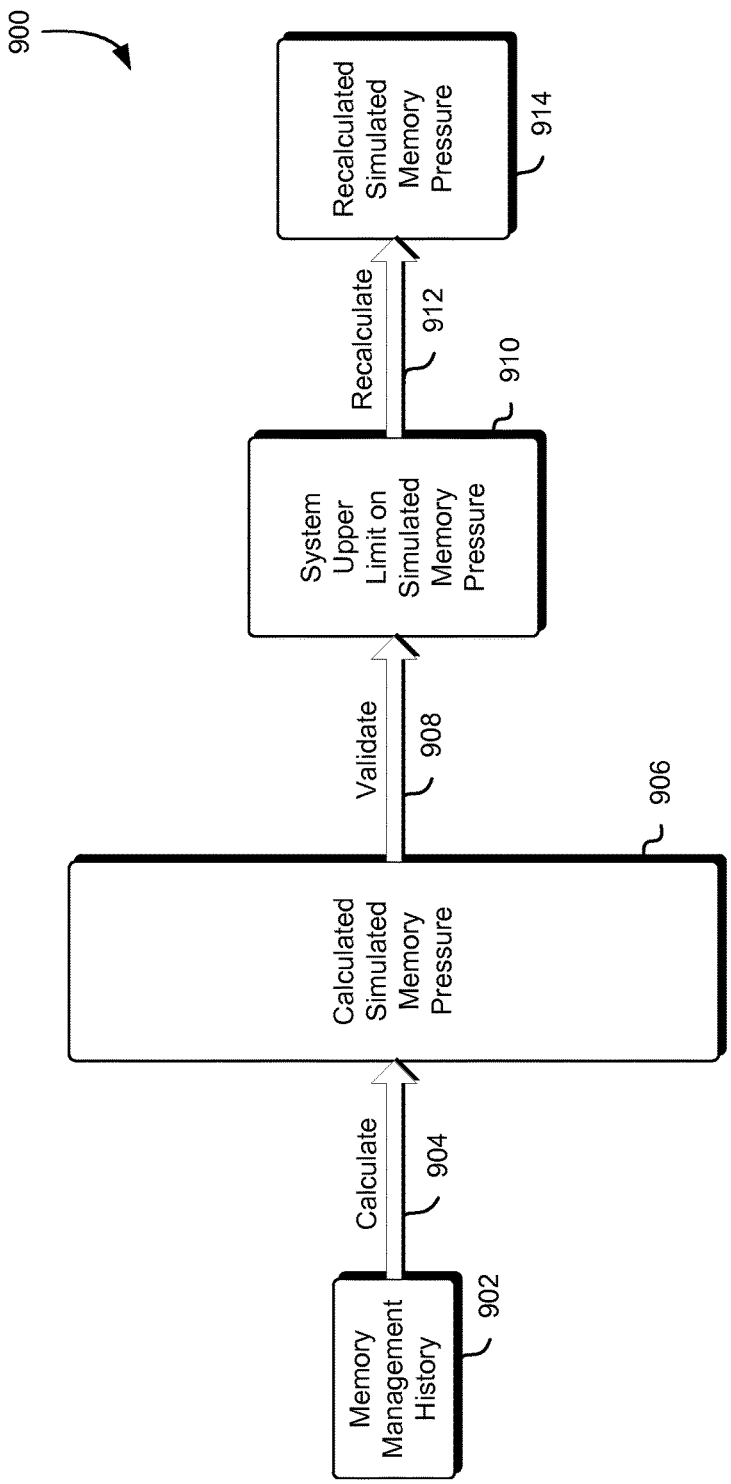
FIG. 9 illustrates an example environment in which calculating, validating and recalculating a simulated memory pressure in accordance with at least one embodiment.

FIG. 9 illustrates an example environment 900 for calculating, validating and recalculating a simulated memory pressure as described herein at least in connection with FIG. 4 and in accordance with at least one embodiment. A memory management history 902 may be used to calculate 904 a calculated simulated memory pressure 906. The memory management history may include a plurality of tracked sample types which may be used to calculate a memory size equivalent for the aggregation of the tracked sample types. In some embodiments, the memory size equivalents may also be aggregated to form a total calculated simulated memory pressure for the system. In some embodiments, it may be undesirable to apply a simulated memory pressure that exceeds a system defined maximum value and in such embodiments, before applying the calculated simulated memory pressure, the memory management system may 908 validate the calculated simulated memory pressure by comparing it to a system defined upper limit on the simulated memory pressure 910 to make sure that the calculated simulated memory pressure does not exceed the system defined upper limit. If the calculated simulated memory pressure does exceed a system defined maximum value, the system may recalculate 912 the calculated simulated memory pressure by, for example, transforming the memory size equivalents used to calculate the simulated memory pressure according to one or more equivalence curves calculated to rescale the calculated simulated memory pressure and produce an acceptable recalculated simulated memory pressure 914.

Figure 10:
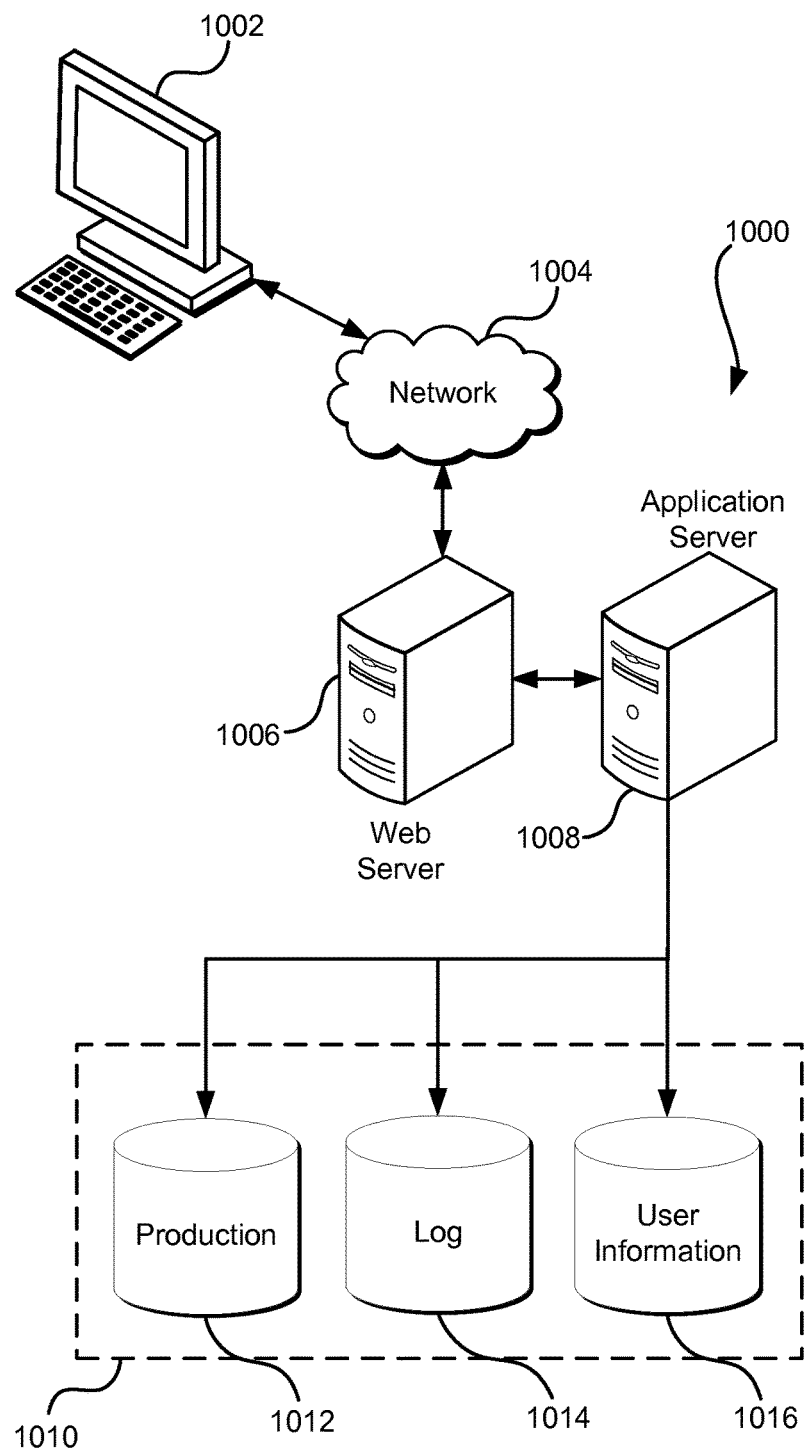
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    monitoring a memory management system of a memory constrained computer system running one or more applications with associated memory to measure one or more tracked samples of the associated memory;
    instantiating, by the memory management system, one or more memory management objects associated with one or more garbage collectors of the computer system;
    maintaining a memory management history comprising a plurality of samples of each of the one or more tracked samples;
    in response to an actual or pending low memory state associated with the memory, calculating, based at least in part on a heuristic used by a subset of the one or more garbage collectors, a simulated memory pressure for the one or more applications at least by aggregating one or more memory size equivalents of each of the one or more tracked samples, the simulated memory pressure an allocated amount of the memory associated with the one or more applications as allocated by the memory management system; and
    applying the simulated memory pressure to the subset of the one or more garbage collectors by at least adjusting one or more memory pressure parameters of a subset of the one or more memory management objects so as to adjust operation of the subset of the one or more garbage collectors in accordance with the simulated memory pressure.

2. The computer-implemented method of claim 1, wherein the tracked samples at least include a number of major page faults during a system defined sample period.

3. The computer-implemented method of claim 1, wherein the tracked samples at least include a number of memory page allocations satisfied by free memory pages during a sample period.

4. The computer-implemented method of claim 1, wherein the tracked samples are based at least in part on an average time between freeing a memory page and allocating the memory page during a system defined sample period.

5. The computer-implemented method of claim 1, wherein the tracked samples are based at least in part on a number of logical memory pages mapped to physical memory pages during a system defined sample period.

6. The computer-implemented method of claim 1, wherein maintaining the memory management history includes storing the memory management history in a ring buffer.

7. The computer-implemented method of claim 1, further comprising selecting the subset of the one or more garbage collectors by the memory management system based at least in part on one or more measurements of the one or more applications.

8. A system, comprising:
one or more processors; and
system memory including executable instructions that, when executed by the one or more processors, cause the system, to implement at least:
  a garbage collector configured to return unused memory from a set of memory to the system in accordance with a set of one or more input parameters of the garbage collector; and
  a memory management subsystem configured to at least cause the garbage collector to free a subset of the memory allocated by an application by:
    calculating a simulated memory pressure for at least the application in response to the system being in an actual or pending low memory state, the simulated memory pressure being calculated in connection with a heuristic used by the garbage collector to return the unused memory and from at least one or more tracked memory samples associated with the system memory used by the application, the simulated memory pressure differing from an allocated amount of the system memory allocated to the application; and
    applying the simulated memory pressure to the garbage collector by adjusting one or more of the set of one or more input parameters of the garbage collector so as to adjust operation of the garbage collector in accordance with the simulated memory pressure.

9. The system of claim 8, wherein the instructions, when executed by the one or more processors, further cause the system to implement a memory monitoring system configured to at least measure and record the one or more tracked samples of the system memory.

10. The system of claim 9, wherein the instructions, when executed by the one or more processors, further cause the memory management subsystem to store the one or more tracked samples of the system memory in a memory management history buffer.

11. The system of claim 9, wherein the instructions, when executed by the one or more processors, further cause the memory management subsystem to store the one or more tracked samples of the system memory in an exponentially weighted moving average field.

12. The system of claim 9, wherein the one or more tracked samples at least include a number of major page faults during a system defined sample period.

13. The system of claim 9, wherein the one or more tracked samples at least include an average time between freeing a memory page and allocating the memory page during a system defined sample period.

14. A non-transitory computer-readable storage medium having collectively stored thereon executable instructions that, when executed by one or more processors of a computer system, cause the computer system to at least:
in response to an actual or pending low memory state associated with a set of computer system memory, calculate a simulated memory pressure based at least in part on a heuristic used by a memory manager associated with a subset of the set of computer system memory, from one or more tracked samples of the subset of the set of computer system memory, the simulated memory pressure differing from an allocated amount of the set of computer system memory allocated to a running application associated with the at least one or more tracked samples; and
apply the simulated memory pressure to the memory manager associated with the subset of the set of computer system memory by adjusting one or more input parameters of the memory manager, so as to adjust operation of the memory manager in accordance with the simulated memory pressure.

15. The non-transitory computer-readable storage medium of claim 14, wherein the instructions that cause the computer system to apply the simulated memory pressure to the memory manager do so as a result of instructions that, when executed, cause the computer system to detect that the computer system is in a low memory state.

16. The non-transitory computer-readable storage medium of claim 14, wherein the memory manager is a garbage collector.

17. The non-transitory computer-readable storage medium of claim 14, wherein the instructions further comprise instructions that, when executed by the one or more processors, cause the computer system to implement a memory monitoring system configured to at least measure and record the one or more tracked samples of the set of computer system memory.

18. The non-transitory computer-readable storage medium of claim 14, wherein the instructions further comprise instructions that, when executed by the one or more processors, cause the computer system to store the one or more tracked samples of the set of computer system memory in a memory management history buffer.

19. The non-transitory computer-readable storage medium of claim 14, wherein the instructions that cause the computer system to calculate the simulated memory pressure further include instructions that cause the computer system to rescale the calculated value based at least in part on a logarithmic equivalence curve based at least in part on a system defined maximum simulated memory pressure value, the logarithmic equivalence curve converging logarithmically to the system defined maximum simulated memory pressure value.

20. The non-transitory computer-readable storage medium of claim 14, wherein the instructions further comprise instructions that, when executed by the one or more processors, cause the computer system to store the one or more tracked samples of the system memory in an exponentially weighted moving average field.

* * * * *